(12) United States Patent
Tiirola et al.

(10) Patent No.: US 10,674,488 B2
(45) Date of Patent: *Jun. 2, 2020

(54) CHANNELIZATION PROCEDURE FOR IMPLEMENTING PERSISTENT ACK/NACK AND SCHEDULING REQUEST

(71) Applicant: Nokia Solutions and Networks Oy, Espoo (FI)

(72) Inventors: Esa Tiirola, Kempele (FI); Kari Hooli, Oulu (FI); Timo Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,256

(22) Filed: Feb. 15, 2017

(65) Prior Publication Data

US 2017/0164353 A1 Jun. 8, 2017

Related U.S. Application Data

(63) Continuation of application No. 14/953,616, filed on Nov. 30, 2015, now Pat. No. 9,614,657, which is a (Continued)

(51) Int. Cl.
*H04W 4/00* (2018.01)
*H04W 72/04* (2009.01)
(Continued)

(52) U.S. Cl.
CPC ......... *H04W 72/0413* (2013.01); *H04J 13/22* (2013.01); *H04L 1/18* (2013.01);
(Continued)

(58) Field of Classification Search
CPC ......... H04W 72/0413; H04W 72/0446; H04W 72/0453; H04L 5/0055; H04L 5/0007;
(Continued)

(56) References Cited

U.S. PATENT DOCUMENTS 5,530,917 A 6/1996 Andersson et al.
7,027,400 B2 4/2006 O'Neill
(Continued)

FOREIGN PATENT DOCUMENTS

EP 0709983 B1 6/2001
EP 1773088 A1 7/2007

OTHER PUBLICATIONS

U.S. Appl. No. 60/934,066, filed Jun. 11, 2007.3*
(Continued)

*Primary Examiner* — Faisal Choudhury
(74) *Attorney, Agent, or Firm* — Harrington & Smith

(57) ABSTRACT

In one exemplary embodiment, a method includes: configuring a common resource space having a plurality of time-frequency resources and code resources, where the common resource space includes a first portion for a first type of signaling and a second portion for a second type of signaling, where the first type of signaling includes at least one of persistent acknowledgement signaling and scheduling request signaling, where the second type of signaling includes dynamic acknowledgement signaling; and allocating, based on the configured common resource space, resources of the common resource space for the at least one of persistent acknowledgement signaling and scheduling request signaling.

16 Claims, 6 Drawing Sheets

Related U.S. Application Data continuation of application No. 14/466,248, filed on Aug. 22, 2014, now Pat. No. 9,203,588, which is a continuation of application No. 12/383,239, filed on Mar. 20, 2009, now Pat. No. 8,837,421.

(60) Provisional application No. 61/070,907, filed on Mar. 26, 2008.

(51) Int. Cl.
  *H04L 1/18*    (2006.01)
  *H04L 5/00*    (2006.01)
  *H04J 13/22*    (2011.01)

(52) U.S. Cl.
  CPC .......... *H04L 5/0007* (2013.01); *H04L 5/0053* (2013.01); *H04L 5/0055* (2013.01); *H04L 5/0057* (2013.01); *H04L 5/0091* (2013.01); *H04W 72/0446* (2013.01); *H04W 72/0453* (2013.01); *H04L 5/0064* (2013.01)

(58) Field of Classification Search
  CPC ....... H04L 5/0057; H04L 1/18; H04L 5/0091; H04L 5/0053; H04L 5/0064; H04J 13/22
  USPC ...................................................... 370/330
  See application file for complete search history.

(56) References Cited

U.S. PATENT DOCUMENTS

| | | | |
|---|---|---|---|
| 7,106,708 | B2 | 9/2006 | Lu |
| 8,031,688 | B2 | 10/2011 | Papasakellariou et al. |
| 2003/0035440 | A1 | 2/2003 | Casaccia et al. |
| 2007/0286066 | A1 | 12/2007 | Zhang et al. |
| 2008/0049690 | A1* | 2/2008 | Kuchibhotla ....... H04L 27/2608 370/338 |
| 2008/0080422 | A1 | 4/2008 | Frederiksen et al. |
| 2008/0084845 | A1* | 4/2008 | Kuchibhotla ........ H04B 7/2656 370/331 |
| 2008/0123593 | A1 | 5/2008 | Fujita et al. |
| 2008/0175195 | A1 | 7/2008 | Cho et al. |
| 2008/0225791 | A1 | 9/2008 | Pi et al. |
| 2008/0273547 | A1 | 11/2008 | Phinney |
| 2008/0287155 | A1 | 11/2008 | Xu et al. |
| 2008/0310540 | A1 | 12/2008 | Tiirola et al. |
| 2008/0316957 | A1 | 12/2008 | Shen et al. |
| 2009/0010240 | A1* | 1/2009 | Papasakellariou .... H04L 5/0007 370/344 |
| 2009/0092103 | A1 | 4/2009 | Rao ................ 370/336 |
| 2009/0103482 | A1* | 4/2009 | Imamura ............... H04L 5/0055 370/329 |
| 2009/0196229 | A1* | 8/2009 | Shen ........................ H04B 1/69 370/328 |
| 2009/0207797 | A1 | 8/2009 | Shen et al. |
| 2009/0225686 | A1 | 9/2009 | Haartsen ...................... 370/277 |
| 2009/0225738 | A1 | 9/2009 | Xu ................... 370/343 |
| 2009/0239568 | A1* | 9/2009 | Bertrand ........... H04W 52/0225 455/522 |
| 2009/0245198 | A1 | 10/2009 | Tiirola et al. |
| 2010/0002655 | A1 | 1/2010 | Ofuji et al. |
| 2010/0296436 | A1* | 11/2010 | Kwon ................ H04J 13/0059 370/328 |
| 2011/0032887 | A1 | 2/2011 | Kishiyama et al. |

OTHER PUBLICATIONS

U.S. Appl. No. 60/976,959, filed Oct. 2, 2007.*
3GPP TSG RAN WG1 #52 R1-080677; Source: Samsung ; Title: ACK/NAK Repetitions in E-UTRA UL; Sorrento, Italy, Feb. 11-15, 2008.*
NTT DOCOMO Inc.; "UL ACK/NACK resource allocation for DL semi-persistent scheduling"; R2-081857; 2008; whole document (4 pages).
Panasonic; "UL Rate Control and dynamic/persistent resource allocations"; 3GPP Draft, R2-074862; Jeju, Korea; Nov. 2007; XP050137368; whole document (3 pages).
Texas Instruments; "SP"; 3GPP TSG RAN WGl #52; RI-080709; Sorrento, Italy, Feb. 11-15, 2008; whole document (4 pages).
NEC Group; "Multiplexing off uplink data-non-associated control signal without data"; 3GPP Draft, R1-072122; May 2, 2007; XP050105871; Section 4; $3^{rd}$ Generation Partnership Project (3gpp), Mobile Competence Centre, 650 Route Des Lucioles, F-06921 Sophia-Antipolish Cedex, France.
Texas Instruments; "Simultaneous CQI and ACK/NAK Transmission in Uplink"; 3GPP Draft, R1-073431-CQIACK; Athens, Greece; Aug. 15, 2007; XP050107046; Sections 1, 2, Figure 2; $3^{rd}$ Generation Partnership Project (3gpp), Mobile Competence Centre, 650 Route Des Lucioles, F-06921 Sophia-Antipolish Cedex, France.
Motorola; "Multiplexing of UL L1/L2 control signals in the absence of data"; 3GPP Draft, R1-072185 UL CCH; Kobe, Japan; May 2, 2007; XP0505925; Sections 3, 4, 5; $3^{rd}$ Generation Partnership Project (3gpp), Mobile Competence Centre, 650 Route Des Lucioles, F-06921 Sophia-Antipolish Cedex, France.
"Joint proposal on uplink ACK/NAK channelization"; 3GPP TSG RAN WG1 #bis, R1-080035; Jan. 2008; whole document (6 pages).
"Physical-layer parameters to be configured by RRC"; TSG-RAN WG1 #bis, R1-080621; Jan. 2008; whole document (6 pages).
3GPP TS 36.300 V8.2.0; "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Sep. 2007; whole document (109 pages).
"Channelization of SRI and persistent ACK/NACK on PUCCH"; 3GPP TSG RAN WG1 Meeting #52bis, R1-081460; Shenzhen, China; Mar. 31-Apr. 4, 2008; whole document.
3GPP TS 36.211 V8.1.0; "$3^{rd}$ Generation Partnership Project, Technical Specification Group Radio Access Network, Evolved Universal Terrestrial Radio Access (E-UTRA), Physical Channel and Modulation"; Nov. 2007; whole document.
3GPP TS 36.300 V8.3.0; "$3^{rd}$ Generation Partnership Project, Technical Specification Group Radio Access Network, Evolved Universal Terrestrial Radio Access (E-UTRA) and Evolved Universal Terrestrial Radio Access Network (E-UTRAN)"; Dec. 2007; whole document.
Samsung; "ACK/NAK Repetiti6ns in E-UTRA UL"; 3GPP Draft, R1-080677 ACK_NAK_Repeat; Sorrento, Italy; Feb. 5, 2008; XP050109173 [retrieved on Feb. 5, 2008]; whole document; $3^{rd}$ Generation Partnership Project (3gpp), Mobile Competence Centre, 650 Route Des Lucioles, F-06921 Sophia-Antipolish Cedex, France.
NTT DOCOMO et al.; "Implicit Resource Allocation of ACK/NACK Signal in E-UTRA Uplink"; 3GPP TSG-RAN WG1 #48BIS, R1-071660; St. Julians, Malta; Mar. 26, 2007; XP003023819; pp. 1-3, Section 3.
Nokia Siemens Networks et al.; "ACK/NACK channelization for PRBs containing both ACK/NACK and CQI"; 3GPP Draft, R1-080931; Sorrento, Italy; Feb. 5, 2008; XP050109403 [retrieved on Feb. 5, 2008]; whole document ; $3^{rd}$ Generation Partnership Project (3gpp), Mobile Competence Centre, 650 Route Des Lucioles, F-06921 Sophia-Antipolish Cedex, France.
Panasonic; "Indication of combination between L1/L2 control signaling and uplink data"; 3rd Generation Partnership Project (3GPP); Technical Specification Group (TSG) Radio Access Network (RAN); Workinggroup 1 (WG1), R1-060793: Mar. 27, 2006; XP003019431; whole document (3 pages).
Nokia; "Uplink Scheduling for VoIP"; 3GPP TSG-RAN WG2 #57, R2-070476; St. Louis, Missouri; Feb. 12, 2007; XP003023534; whole document (15 pages).
3GPP TS 36.213 V8.2.0; "3GPP TS 36.213 V8.2.0—Technical Specification Group Radio Access Network; Evolved Universal Terrestrial Radio Access (E-UTRA); Physical layer procedures (Release 8)"; Mar. 20, 2008; XP002533914, Retrieved from the Internet: http://www.3gpp.org/ftp/Specs/html-Info/36213.htm; pp. 1-30, Section 10.
Texas Instruments, "Dynamic ACK/NACK Channelization on PUCCH", R1-081375, 3GPP TSG RAN WG1 #52bis, Shenchen, China, Mar.

(56) References Cited

OTHER PUBLICATIONS

31-Apr. 4, 2008; pp. 1-4; $3^{rd}$ Generation Partnership Project (3GP); Mobile Competence Centre; 650, Route des Lucioles; F-06921 Sophia-Antipolis Cedex, France.

* cited by examiner

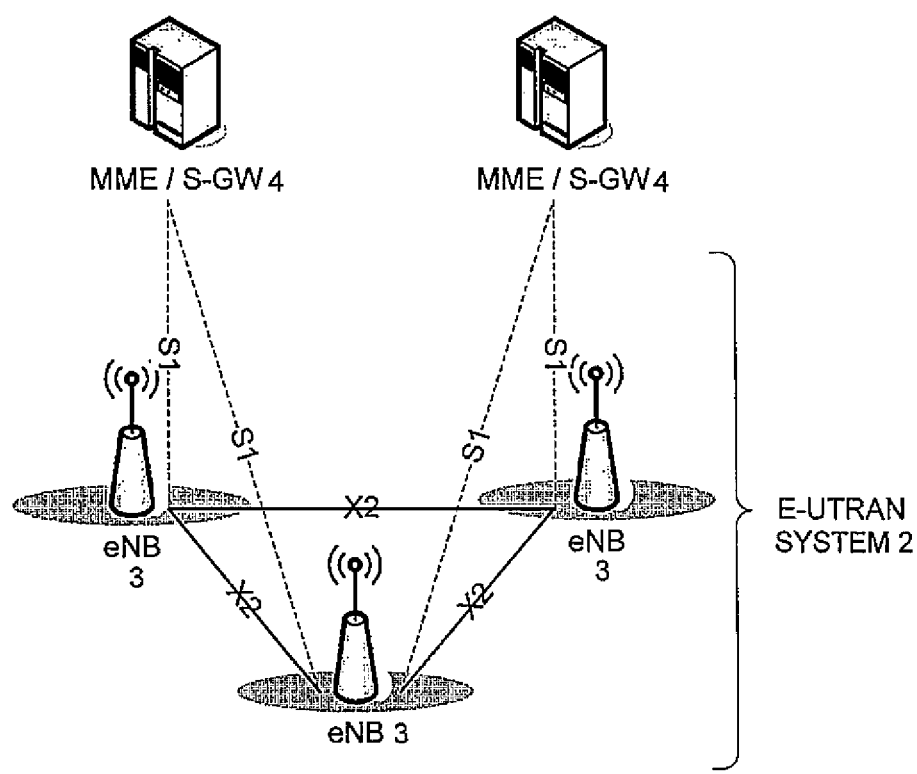
FIG. 1: PRIOR ART

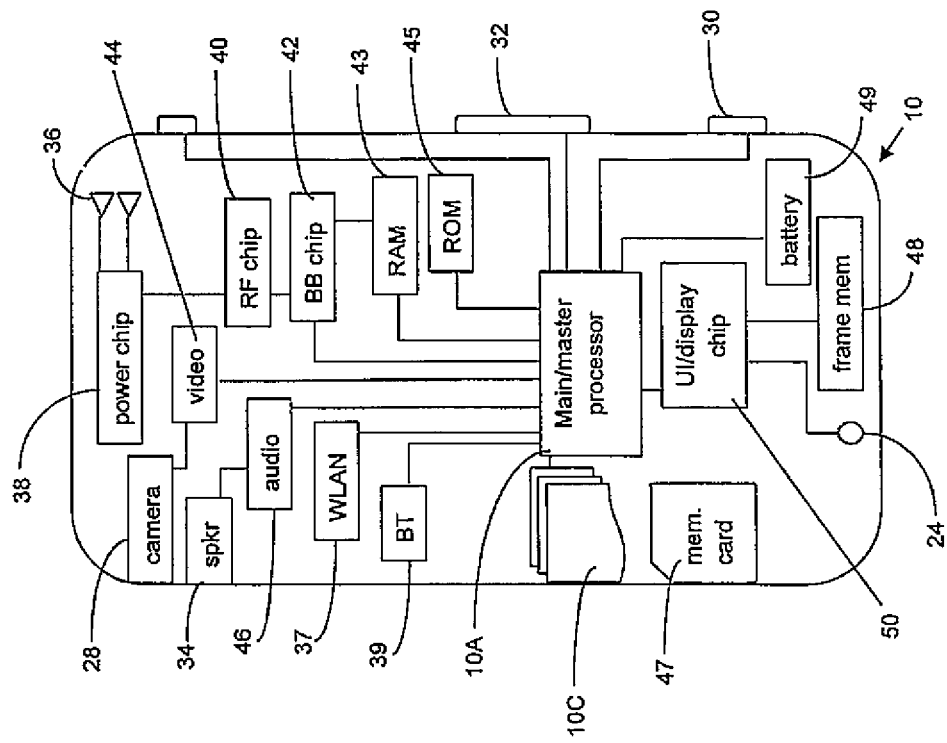
FIG. 2B
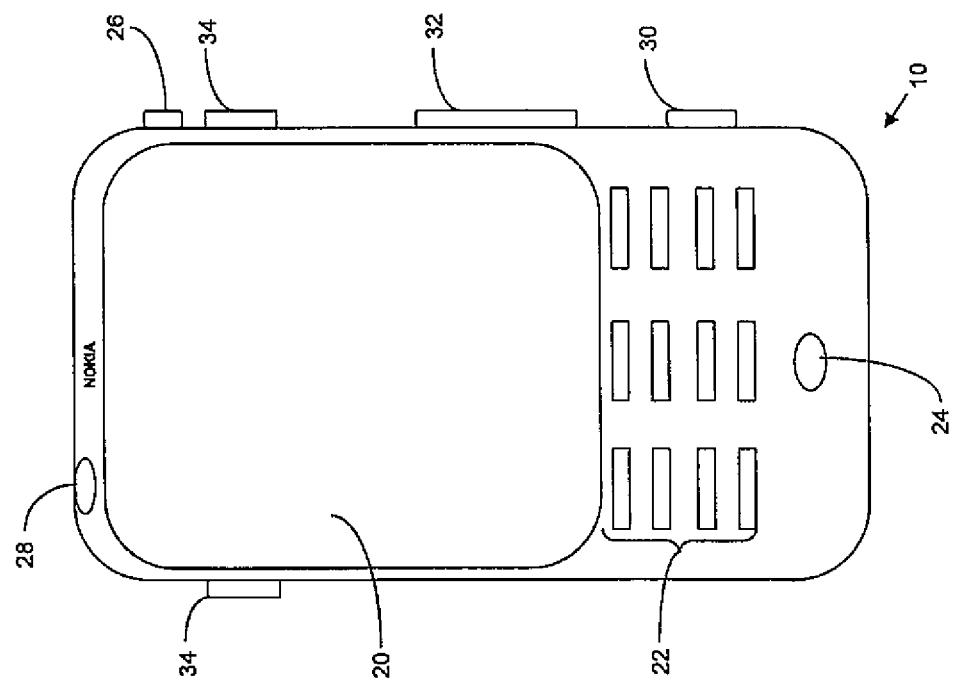

| | |
|---|---|
| 1 | CQIs |
| 3 | CQIs |
| 5 | CQIs |
| 7 | CQIs and dynamic ACKNACKs |
| ... n-1 | dynamic ACK/NACKs |
| | |
| | |
| | |
| | |
| | |
| | |
| | |
| | |
| | |
| | |
| | |
| ...n | dynamic ACK/NACKs |
| ... | dynamic ACK/NACKs |
| 4 | CQIs |
| 2 | CQIs |
| 0 | CQIs |

Figure 3

CHANNELIZATION PROCEDURE FOR IMPLEMENTING PERSISTENT ACK/NACK AND SCHEDULING REQUEST

CROSS-REFERENCE TO RELATED APPLICATIONS

This application is a continuation of U.S. patent application Ser. No. 14/953,616, filed Nov. 30, 2015, which is a continuation of U.S. patent application Ser. No. 14/466,248, filed Aug. 22, 2014, which is a continuation of U.S. patent application Ser. No. 12/383,239, filed Mar. 20, 2009, which claims the benefit of U.S. Provisional Application Ser. No. 61/070,907, filed Mar. 26, 2008, the disclosure of which is incorporated herein by reference in its entirety.

TECHNICAL FIELD

The exemplary and non-limiting embodiments of this invention relate generally to wireless communication systems, apparatus, methods and computer program products and, more specifically, relate to techniques to signal information between a mobile device and a network device.

BACKGROUND

The following abbreviations that may be found in the specification and/or the drawing figures are defined as follows:
3GPP third generation partnership project
ACK acknowledge
BS base station
BW bandwidth
CAZAC constant amplitude zero autocorrelation
CCE control channel element
CP cyclic prefix
CQI channel quality indicator
DL downlink (eNB towards UE)
eNB E-UTRAN Node B (evolved Node B)
EPC evolved packet core
E-UTRAN evolved UTRAN (LTE)
FDD frequency division duplex
FDMA frequency division multiple access
HARQ hybrid automatic repeat request
LTE long term evolution of UTRAN (E-UTRAN)
MAC medium access control (layer 2, L2)
MM/MME mobility management/mobility management entity
NACK negative acknowledge
Node B base station
OFDMA orthogonal frequency division multiple access
O&M operations and maintenance
PCFICH physical control format indicator channel
PDCCH physical downlink control channel
PDCP packet data convergence protocol
PDU protocol data unit
PHY physical (layer 1, L1)
PRB physical resource block
PUCCH physical uplink control channel
RLC radio link control
RRC radio resource control
RRM radio resource management
S-GW serving gateway
SC-FDMA single carrier, frequency division multiple access
SR scheduling request
UIE user equipment, such as a mobile station or mobile terminal
UL uplink (UE towards eNB)
UTRAN universal terrestrial radio access network
ZAC zero autocorrelation A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

FIG. 1 reproduces FIG. 4 of 3GPP TS 36.300, and shows the overall architecture of the E-UTRAN system 2. The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a SI MME interface and to a S-GW by means of a S1-U interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

From a PUCCH resource allocation point of view, four basic types of control signals can be transmitted:
ACK/NACKs of dynamically scheduled DL data (PUCCH format 1a and 1b);
periodic CQIs (PUCCH format 2, 2a, and 2b);
SR indicators (PUCCH format 1); and
ACK/NACKs of persistently scheduled DL data (PUCCH format 1a and 1b).

Reference with regard to various PUCCH formats can be made to subclauses 5.4.1, 5.4.2 and 5.4.3 of 3GPP TS 36.211 V8.1.0 (2007-11) Technical Specification 3rd Generation Partnership Project; Technical Specification Group Radio Access Network; Evolved Universal Terrestrial Radio Access (E-UTRA); Physical Channels and Modulation (Release 8), incorporated by reference herein in its entirety.

For dynamic ACK/NACKs, it has been agreed that the PUCCH resource to be used is implicitly derived from the PDCCH CCE index. Due to the implicit mapping, the ACK/NACK channel on the PUCCH should be pre-configured by higher layer signaling. This pre-configuration is typically referred to as ACK/NACK channelization. The details for implicit mapping of dynamic ACK/NACKs have been agreed to in 3GPP.

The basic principle of implicit channelization of dynamic ACK/NACKs is to have a one-to-one mapping to the lowest CCE index. The total number of CCEs depends on the system bandwidth and on the number of OFDM symbols allocated for control signaling in a DL subframe, which is signaled in each subframe using the PCFICH (1, 2, or 3 OFDM symbols/subframe). This means that, for example, with a 20 MHz system bandwidth the number of CCEs can be as many as 80 if three OFDM symbols are allocated for control signaling in a subframe. However, if the PCFICH=1 there is a significantly smaller number of CCEs. This implies that the required amount of UL resources for the dynamic (implicit) ACK/NACKs can vary dynamically from one subframe to another.

It has also been agreed that the PUCCH resources used for periodic CQI transmission (e.g., the cyclic shift), the SR indicator and the persistent ACK/NACK are explicitly configured. Furthermore, it has been agreed that the PUCCH PRBs with CQI are to be placed on the outermost PRBs next to band edges, followed by the dynamic ACK/NACKs.

Although there is a general agreement concerning the resource allocation of each of these types of PUCCH signals, the specific details of how to allocate the PUCCH resources for SR and persistent ACK/NACK have not yet been worked out.

As noted above, the current agreement in 3GPP is to allocate resources for CQI to the outermost PRBs next to band edges, and to allocate the dynamic ACK/NACKs next to the CQI resources. The principle is shown in FIG. 3. The number of CQI PRBs is signaled via higher layer using a parameter $N_{RB}^{(2)}$ ($N_{RB}^{(2)}=7$ in the example of FIG. 3). Further, the CQI PRB having a largest index can be split to accommodate both CQIs and dynamic ACK/NACKs with parameter $N_{cs}^{(1)}$. The resources for the dynamic ACK/NACKs are placed next to the CQI resources. An ACK/NACK index of a certain UE can be directly derived from its lowest CCE index, the number of PDCCH CCEs, and hence the number of implicitly allocated dynamic ACK/NACK resources scales, according to the system bandwidth and the value of PCFICH.

The SR and persistent ACK/NACK configuration have not been discussed in detail in the 3GPP. The basic assumption has been, however, that a separate resource pool (e.g. one or more PRBs) is semi-statically assigned for the SR and persistent ACK/NACK (see FIG. 3). However, one significant drawback of this approach is that due to the dynamically varying PCFICH and hence the (possibly constantly) changing number of dynamic (implicit) ACK/NACK resources/channels, there will exist an unused gap between the dynamic ACK/NACK channels and the SR and persistent ACK/NACK channels when PCFICH<3. This leads to increased UL overhead and/or spectrum fragmentation. Changes in the parameters $N_{RB}^{(2)}$ (number of PRBs reserved for CQI) and/or $N_{cs}^{(1)}$ will make the PUCCH space even more dynamic. The alternative, that is keeping $N_{cs}^{(1)}$ and $N_{RB}^{(2)}$ essentially constant, has the disadvantage of causing over-dimensioning of the periodic CQI resources, which is also wasteful of the spectrum.

SUMMARY

The below summary section is intended to be merely exemplary and non-limiting.

The foregoing and other problems are overcome, and other advantages are realized, by the use of the exemplary embodiments of this invention.

In one exemplary embodiment of the invention, a method comprising: configuring a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling; and allocating, based on the configured common resource space, resources of the common resource space for the at least one of persistent acknowledgement signaling and scheduling request signaling.

In another exemplary embodiment of the invention, a program storage device readable by a machine, tangibly embodying a program of instructions executable by the machine for performing operations, said operations comprising: configuring a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling; and allocating, based on the configured common resource space, resources of the common resource space for the at least one of persistent acknowledgement signaling and scheduling request signaling.

In another exemplary embodiment of the invention, an apparatus comprising: at least one processor configured to configure a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling, where the at least one processor is further configured to allocate, based on the configured common resource space, resources of the common resource space for the at least one of persistent acknowledgement signaling and scheduling request signaling; and a transceiver configured to transmit or receive at least one message in accordance with the allocation.

In another exemplary embodiment of the invention, an apparatus comprising: means for configuring a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling; and means for allocating, based on the configured common resource space, resources of the common resource space for the at least one of persistent acknowledgement signaling and scheduling request signaling.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1 reproduces FIG. 4 of 3GPP TS 36.300, and shows the overall architecture of the E-UTRAN system.

FIG. 2B shows a more particularized block diagram of an exemplary user equipment such as that shown in FIG. 2A.

FIG. 3 shows an example of a conventional PUCCH mapping to PRBs.

DETAILED DESCRIPTION

Figure 2A:
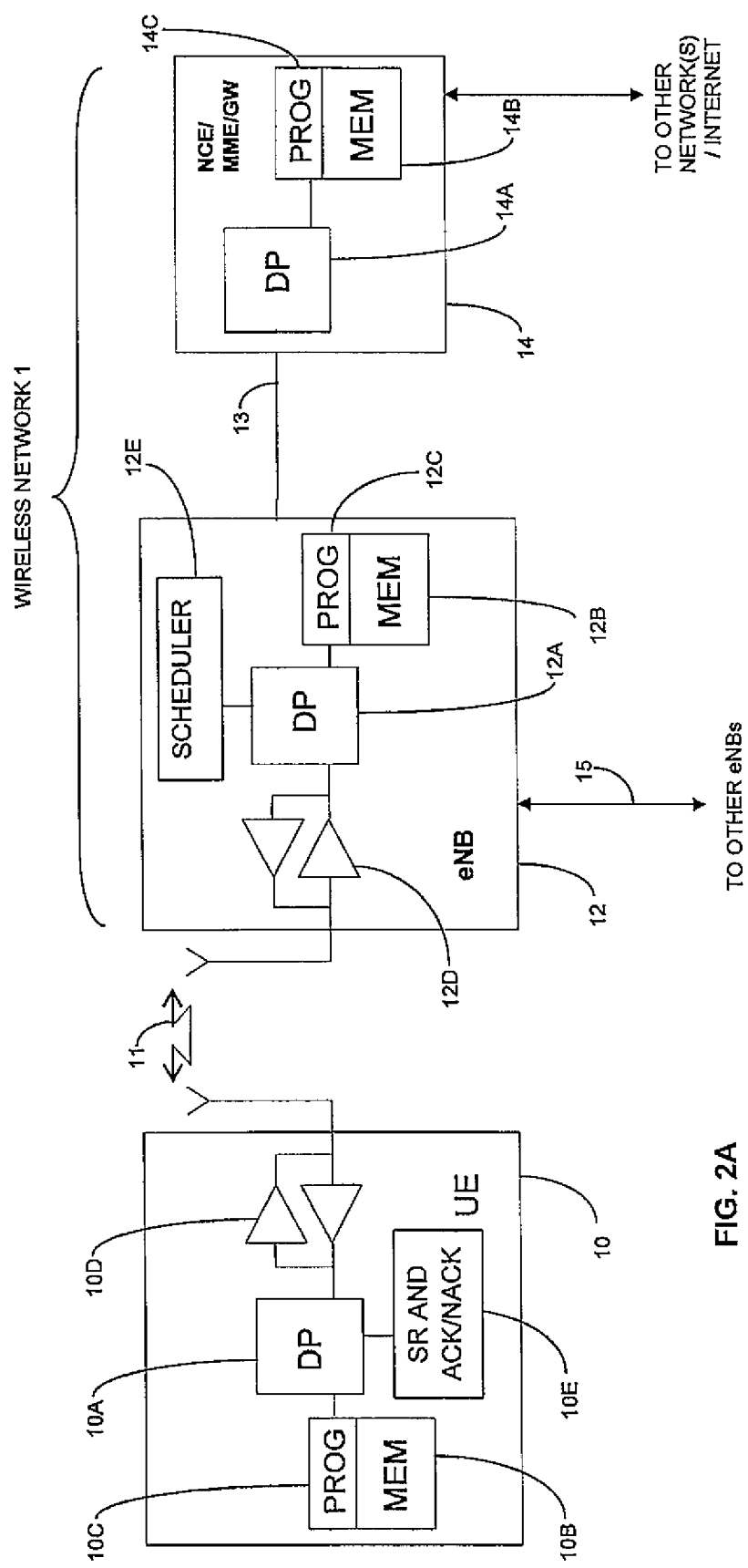
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with one or more other networks, such as a telephone network and/or a data communications network (e.g., the Internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer or a data processor (DP) 12A, a computer-readable memory medium embodied as a memory (MEM) 12B that stores a program of computer instructions (PROG) 12C, and a suitable radio frequency (RF) transceiver 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer or a data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a unit 10E ("SR AND ACK/NACK") for determining and reporting SR and ACK/NACK signaling to the eNB 12. The eNB 12 includes a resource allocation and scheduling unit ("SCHEDULER") 12E. The SR and ACK/NACK signaling unit 10E and the scheduler 12E are assumed to be constructed and operated in accordance with the exemplary embodiments of this invention, as described in detail below.

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 30, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention may be most relevant to one or more of the processors (e.g., components 10E and/or 12E in FIG. 1), though it is noted that other exemplary embodiments need not be disposed in such devices or components, but may be disposed across various chips and/or memories as shown, or disposed within one or more other processors that combine one or more of the functions described above with respect to FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to processors, data processors, processing devices, processing components, processing blocks, circuits, circuit devices, circuit components, circuit blocks, integrated circuits and/or chips (e.g., chips comprising one or more circuits or integrated circuits).

Of particular interest herein are the Layer 1 (PHY) specifications for E-UTRAN (generally described in 3GPP TS 36.211 V8.1.0, 3GPP TS 36.213 V8.2.0 and 3GPP TS 36.331 V8.1.0), including the resource allocation of ACK/NACKs of persistent DL data, referred to as persistent ACK/NACK, as well as the SR indicator on the PUCCH. Novel techniques for allocating the resources for persistent ACK/NACK and SR are described below. As a non-limiting example, exemplary embodiments of the invention provide for flexible and efficient usage of control resources with low UL overhead and minimal impact on other system aspects.

The exemplary embodiments of this invention provide for resolving open and as yet unresolved issues in the UL control signal resource allocation (e.g., how to allocate PUCCH resources for SR and persistent ACK/NACK), while minimizing needed modifications (e.g., reconfiguration of persistent ACK/NACK and SR resources) and optimizing the UL control signaling overhead.

Another document of interest is R1-081460, "Channelization of SRI and persistent ACK/NACK on PUCCH," incorporated by reference herein in its entirety.

The exemplary embodiments of this invention provide techniques for allocating resources for persistent ACK/NACK and SR. The resources may be allocated in a relative manner, for example, beginning after (e.g., immediately after) the dynamic ACK/NACK resources or, as another example, beginning before the dynamic ACK/NACK resources. The resources may also be allocated in a relative manner with respect to a number or size of the CQI resources. In some exemplary embodiments, the CQI resources are located at a beginning of the resource space in question (e.g., the PUCCH). As a further example, the ACK/NACK and SR resource indexes given by the eNB 12 via higher layer signaling may indicate which PUCCH resource to use relative to the resource of the dynamic ACK/NACK resource with the highest index value $n_{PUCCH}^{(1)}$, denoted as $\max(n_{PUCCH,Dynamic}^{(1)})$. In further exemplary embodiments, the persistent ACK/NACK and SR resources may utilize a common physical resource space. In other exemplary embodiments, this common physical resource space may further comprise resources allocated for the dynamic ACK/NACK.

In some exemplary embodiments, the same staggered ACK/NACK channelization structure as defined for the dynamic ACK/NACKs may also be used for persistent ACK/NACK and SR. Alternatively, a different staggered structure may be used for persistent ACK/NACK and SR than for dynamic ACK/NACKs. In such a case, the necessary staggered structure parameters may be included in the higher layer signaling.

For the case of a same staggered structure for all ACK/NACK and SR channels, the exemplary embodiments of this invention may be implemented as follows.

Two new parameters are introduced into the existing E-UTRAN-related specification(s):

$n_{SR}^{(1)}$=index for SR; and $n_{A/NPersistent}^{(1)}$=index for persistent ACK/NACK.

Both of these parameters may be configured semi-statically via RRC signalling. It is also possible to utilize the PDCCH for configuring $n_{A/NPersistent}^{(1)}$. Note that it has previously been agreed to in the 3GPP that the resources used for SR and persistent ACK/NACK are explicitly signalled. Hence, no additional signaling needs to be defined.

Figure 4:
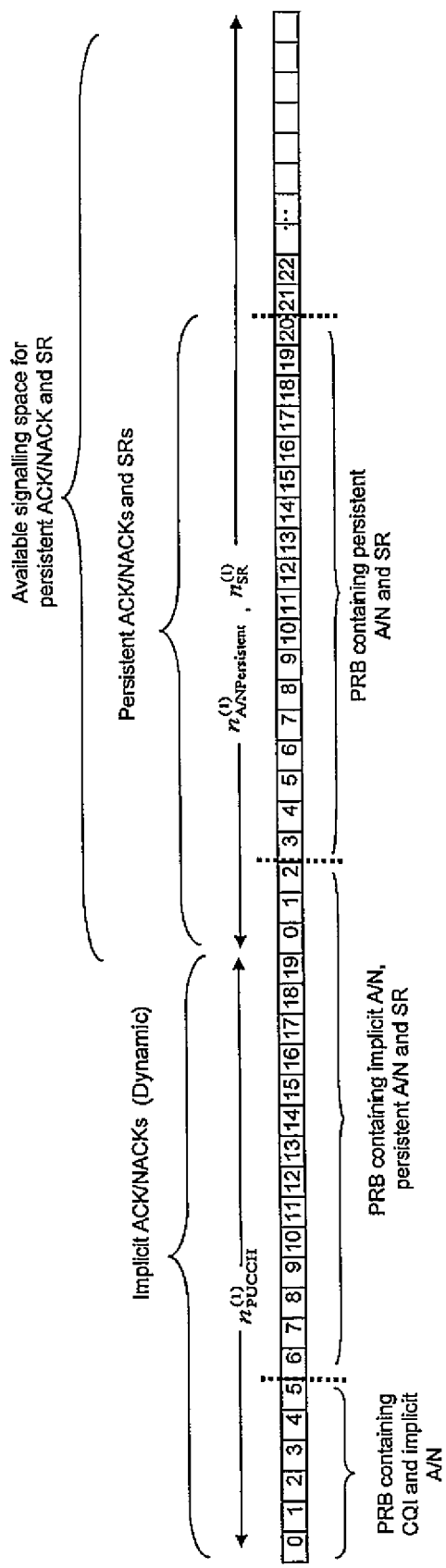
FIG. 4 shows a division of implicit ACK/NACK and persistent ACK/NACK and SR into physical PRBs in accordance with the exemplary embodiments of this invention.

FIG. 4 shows an example how the implicit ACK/NACK, persistent ACK/NACK and SR may be mapped onto PRBs. Note that FIG. 4 assumes a non-limiting case of $\Delta_{shift}^{PUCCH}=2$ and $N_{cs}^{(1)}=6$.

In further exemplary embodiments, the persistent ACK/NACK and SR may share common physical resources. In such a case, two parameters may not be needed and, instead, one parameter, such as $n_{PUCCH}^{(1)}$, can be used.

It should be noted that the above approach does not introduce a problem with respect to a re-mapping function operating within the allocated ACK/NACK PRBs. The signaling space (number of bits) reserved for $n_{A/NPersistent}^{(1)}$, and $n_{SR}^{(1)}$ defines the maximum number of simultaneous channels reserved for SR and persistent ACK/NACK.

FIG. 4 assumes that resource numbering for persistent ACK/NACK and SR begins from $\max(n_{PUCCH,Dynamic}^{(1)})+1$. It further assumes that there is no allocation of SR and persistent ACK/NACK for resources reserved to implicit ACK/NACK. In further exemplary embodiments, the above-noted assumptions may not hold. It is noted that it is possible to define the signaling space for persistent ACK/NACK and SR also in such a manner that two resources are partially overlapping. For example, there may be a fixed-size bit-field in the RRC configuration that defines $n_{PUCCH}^{(1)}$ for persistent ACK/NACK and SR. This approach allows for some savings in ACK/NACK resources in those cases where the DL scheduler 12E of the eNB 12 is configured to operate such that a certain part or parts of the implicit ACK/NACKs are not needed (e.g., these resources can be used by persistent ACK/NACK and SR). It should be noted that FIG. 4 is merely exemplary, and that different arrangements and/or configurations may be utilized on conjunction with the exemplary embodiments of the invention.

For the SR, the index (i.e., the PUCCH index) used in the channelization formulas may be calculated as:

$$n_{PUCCH}^{(1)}=n_{SR}^{(1)}+\max(n_{PUCCH,Dynamic}^{(1)})+1.$$

Similarly, for the persistent ACK/NACK the index may be derived as:

$$n_{PUCCH}^{(1)}=n_{A/NPersistent}^{(1)}+\max(n_{PUCCH,Dynamic}^{(1)})+1.$$

The equations above assume that the quantities $n_{SR}^{(1)}$, $n_{A/NPersistent}^{(1)}$ and $n_{PUCCH}^{(1)} \in \{0, 1, 2, \ldots\}$.

As was stated above, the quantity $\max(n_{PUCCH,Dynamic}^{(1)})$ can be readily calculated since the value of the PCFICH and the system bandwidth are known by the UE 10, as they are used during normal DL reception/UL transmission. Therefore, the UE 10 transmitting persistent ACK/NACK or SR needs to decode the PCFICH prior to transmitting the persistent ACK/NACK or SR. Additionally, any methods (e.g., that currently may be under discussion) that target reducing the implicit ACK/NACK space can be taken into account in this calculation as they affect the number of implicit ACK/NACK channels. Otherwise, all of the formulas in the specification 3GPP TS 36.211 can be used without any change needed.

The use of these exemplary embodiments provides a number of advantages. For example, they provide a simple and straightforward approach, where no additional signaling is required. In addition, UL overhead is optimized and spectrum fragmentation is avoided for those cases where there are varying numbers of implicit ACK/NACK channels and reserved periodic CQI resources on the PUCCH. Further still, the use of these exemplary embodiments does not affect any existing re-mapping function(s).

For the case where the different staggered structure is used for persistent ACK/NACK and SR channels there can be additional changes to the specification. For example, the resource allocation and re-mapping function for the last PRB containing dynamic ACK/NACK resources should be similar to that of the PRB split between the CQI and ACK/NACK resources. This applies to the resource allocation and re-mapping functions of both dynamic and persistent ACK/NACK and SR resources.

Based on the foregoing it should be apparent that the exemplary embodiments of this invention provide methods, apparatus and computer program(s) to accomplish resource allocation for persistent ACK/NACK and scheduling request signaling in a relative manner, beginning after (e.g., immediately after) dynamic ACK/NACK resources, where ACK/NACK and SR resource indices are specified to indicate which resource to use relative to the resource of the dynamic ACK/NACK resource with a highest index value $n_{PUCCH}^{(1)}$ denoted as $\max(n_{PUCCH,Dynamic}^{(1)})$.

The method, apparatus and computer program(s) of the preceding paragraph, where for an ACK/NACK and scheduling request staggered structure the following parameters are defined and configured;

$n_{SR}^{(1)}$=an index for scheduling request (SR); and
$n_{A/NPersistent}^{(1)}$=an index for persistent ACK/NACK,
where the signaling space reserved for $n_{SR}^{(1)}$ and $n_{A/NPersistent}^{(1)}$ defines a maximum number of simultaneous channels reserved for SR and persistent ACK/NACK.

The method, apparatus and computer program(s) of the preceding paragraphs, where for an SR index is calculated as:

$$n_{PUCCH}^{(1)}=n_{SR}^{(1)}+\max(n_{PUCCH,Dynamic}^{(1)})+1,$$

and where an ACK/NACK index is calculated as:

$$n_{PUCCH}^{(1)}=n_{A/NPersistent}^{(1)}+\max(n_{PUCCH,Dynamic}^{(1)})+1.$$

As previously noted, the equations above assume that the quantities $n_{SR}^{(1)}$, $n_{A/NPersistent}^{(1)}$ and $n_{PUCCH}^{(1)} \in \{0, 1, 2, \ldots\}$.

The method, apparatus and computer program(s) of the preceding paragraphs, where a user equipment is configured to compose physical resource blocks for inclusion in a PUCCH in accordance with $n_{SR}^{(1)}$ and $n_{A/NPersistent}^{(1)}$.

The method, apparatus and computer program(s) of the preceding paragraphs, where an eNB is configured to signal $n_{SR}^{(1)}$ and $n_{A/NPersistent}^{(1)}$ to the user equipment.

In another exemplary embodiment, a method comprising: determining an index for an allocation within a resource space, where the resource space is comprised of a plurality of time-frequency resources, where the resource space includes at least one predetermined allocation for at least one of channel quality indicator signaling and dynamic acknowledgement signaling, where the allocation is for at least one of persistent acknowledgement signaling and scheduling request signaling, where the index for the allocation is determined relative to the at least one predetermined allocation; and allocating, based on the determined index, time-frequency resources of the resource space for the at least one of persistent acknowledgement signaling and scheduling request signaling.

In another exemplary embodiment, a method comprising: configuring a resource space (e.g., physical or logical), where the resource space is comprised of a plurality of time-frequency resources and code resources, where the resource space includes at least one predetermined allocation for at least one of channel quality indicator signaling and dynamic acknowledgement signaling, where an allocation in the resource space is for at least one of persistent acknowledgement signaling and scheduling request signaling, where the resource space is common for dynamic acknowledgement signaling, persistent acknowledgement signaling and scheduling request signaling; and allocating a code resource from the configured resource space for the at least one of persistent acknowledgement signaling and scheduling request signaling.

While the above-described exemplary embodiments are with respect to an arrangement wherein resources for CQI are allocated to the outermost PRBs next to band edges, and to allocate the dynamic ACK/NACKs next to the CQI resources (see, e.g., FIG. 3), the exemplary embodiments of the invention are not limited thereto and may be used in conjunction with other arrangements and allocations.

For example, instead of the above-described arrangement, a common PUCCH Format 1/1a/1b space may be utilized. In this common resource space, a first portion of resources may be reserved for persistent ACK/NACK and SR while a second portion of resources, disposed subsequent to or after the first portion, may be reserved for dynamic ACK/NACK. Such an arrangement may be seen as having the persistent ACK/NACK and SR resources utilizing a common physical resource space. In some exemplary embodiments, this common resource space may be located after resources that are allocated for CQI (e.g., CQI signaling).

As a further non-limiting example, consider that the following properties and/or aspects apply. The same staggered ACK/NACK channelization structure as defined for the dynamic ACK/NACK may also be used for persistent ACK/NACK and SR. One parameter, $n_{PUCCH}^{(1)}$, is utilized as an index for both the persistent ACK/NACK and the SR. This parameter may be configured semi-statically via RRC signaling. The signaling space (number of bits) reserved for $n_{PUCCH}^{(1)}$ defines the maximum number of simultaneous channels reserved for SR and persistent ACK/NACK. The signaling space for persistent ACK/NACK and SR is defined in such a manner that the two resources may partially overlap. There may be a fixed-size bit-field in the RRC configuration that defines $n_{PUCCH}^{(1)}$ for persistent ACK/NACK and SR.

In some further exemplary embodiments, one parameter that is signaled (e.g., $N_{RB}^{(2)}$) indicates a number of resources (e.g., PRBs) that are reserved or allocated for the CQI. In such exemplary embodiments, the persistent ACK/NACK and SR may be located relative to the signaled number of resources (e.g., $N_{RB}^{(2)}$). As a non-limiting example, this parameter may be broadcast.

In some further exemplary embodiments, another parameter may be signaled (e.g., $N_{PUCCH}^{(1)}$) to indicate a number of resources (e.g., PRBs) that are reserved or allocated for the common space (i.e., for the persistent ACK/NACK and SR). As a non-limiting example, $N_{PUCCH}^{(1)}$ may be broadcast in order to indicate a size of the PUCCH format 1/1a/1b that is reserved. As a further non-limiting example, and assuming that the dynamic ACK/NACK is located after the reserved common space, such a parameter may be utilized in order to determine a location of the beginning of the portion reserved for dynamic ACK/NACK.

For example, the beginning of the dynamic ACK/NACK resources may be determined by:

$$n_{PUCCH}^{(1)} = N_{RB}^{(2)} + N_{PUCCH}^{(1)} + 1$$

In some exemplary embodiments, the "+1" may not be included, depending on how the parameter ranges are defined, for example.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 5:
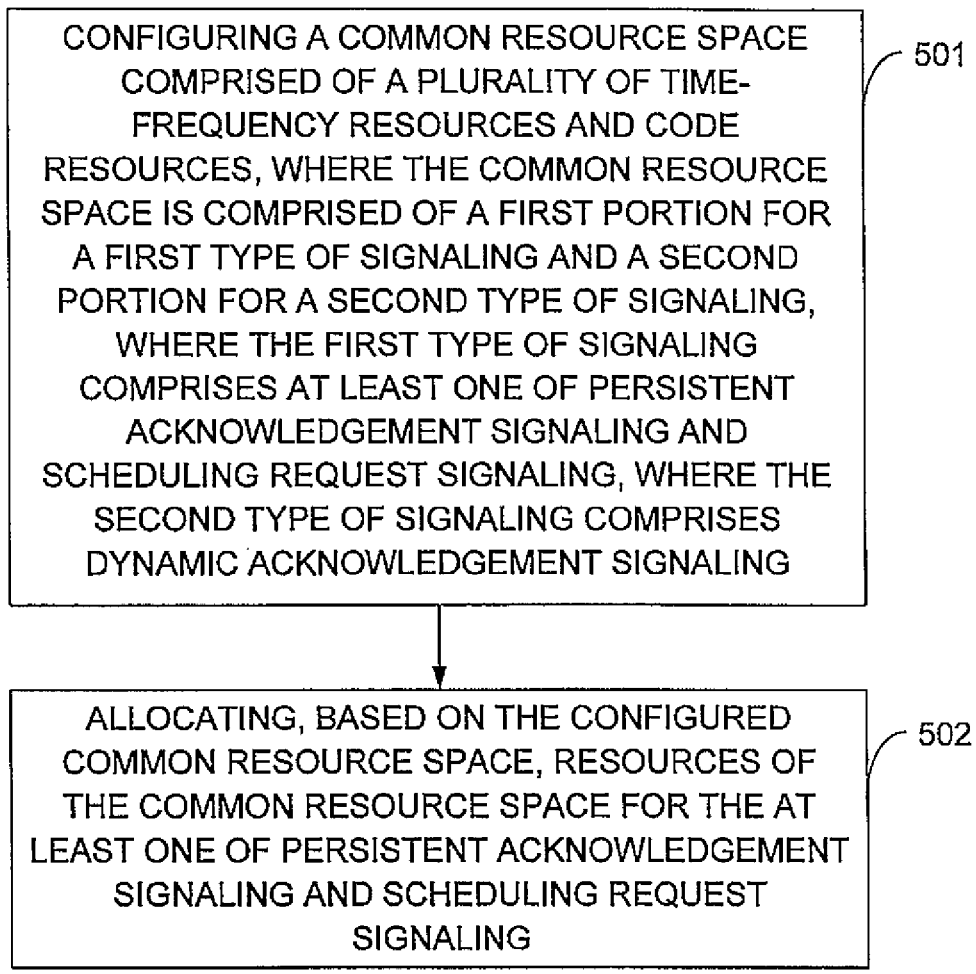
FIG. 5 is a logic flow diagram that illustrates the operation of an exemplary method, and a result of execution of computer program instructions embodied on a computer readable memory, in accordance with the exemplary embodiments of this invention.

(1) In one exemplary embodiment, and with reference to FIG. 5, a method comprising: configuring a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling (501); and allocating, based on the configured common resource space, resources of the common resource space for the at least one of persistent acknowledgement signaling and scheduling request signaling (502).

A method as above, where the time-frequency resources are characterized by a constant amplitude zero autocorrelation (CAZAC) sequence or zero autocorrelation (ZAC) sequence having a length of twelve symbols (180 kHz), a duration of one sub-frame and slot-based frequency hopping that is symmetric over a center frequency. A method as in any above, where the time-frequency resources are characterized by a dedicated cyclic shift and a dedicated orthogonal cover code. A method as in any above, where the first type of signaling and the second type of signaling share a common, staggered channelization structure. A method as in any above, where a resource index for the first type of signaling is signaled explicitly via higher layer signaling or radio resource control signaling. A method as in any above, where a size for the first portion is signaled explicitly. A method as in any above, where the first portion and the second portion partially overlap.

A method as in any above, further comprising: receiving a first parameter indicative of a number of resources used for channel quality indicator signaling. A method as in any above, further comprising: receiving a first parameter indicative of a first beginning resource to use for the first type of signaling. A method as in any above, further comprising: transmitting or receiving at least one message in accordance with the allocation. A method as in any above, where the common resource space is for a portion of a physical uplink control channel. A method as in any above, where the common resource space is for at least one communication occurring within an evolved universal terrestrial radio access network. A method as in any above, where the common resource space is only for a portion (PUCCH Format 1/1a/1b) of a physical uplink control channel.

A method as in any above, where the common resource space is not for a different portion (PUCCH Format 2/2a/2b) of a physical uplink control channel.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described in further detail herein, and, in particular, one or more aspects of the exemplary embodiments of the invention as relating to exemplary methods described herein.

(2) In another exemplary embodiment, a program storage device readable by a machine, tangibly embodying a program of instructions executable by the machine for performing operations, said operations comprising: configuring a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling (501); and allocating, based on the configured common resource space, resources of the common resource space for the at least one of persistent acknowledgement signaling and scheduling request signaling (502).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described in further detail herein, and, in particular, one or more aspects of the exemplary embodiments of the invention as relating to exemplary methods described herein.

(3) In another exemplary embodiment of the invention, an apparatus comprising: at least one processor configured to configure a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling, where the at least one processor is further configured to allocate, based on the configured common resource space, resources of the common resource space for the at least one of persistent acknowledgement signaling and scheduling request signaling; and a transceiver configured to transmit or receive at least one message in accordance with the allocation.

An apparatus as in any above, further comprising: receiving a first parameter indicative of a first beginning resource to use for the first type of signaling. An apparatus as in any above, further comprising: transmitting or receiving at least one message in accordance with the allocation. An apparatus as in any above, where the common resource space is for a physical uplink control channel. An apparatus as in any above, where the common resource space is for at least one communication occurring within an evolved universal terrestrial radio access network. An apparatus as in any above, where the apparatus comprises a mobile station, a mobile node or a mobile phone. An apparatus as in any above, where the apparatus comprises a base station, a relay station or an evolved Node B. An apparatus as in any above, where the apparatus comprises a node within an evolved universal terrestrial radio access network.

An apparatus as in any above, further comprising one or more aspects of the exemplary embodiments of the invention as described elsewhere herein, and, in particular, one or more aspects of the exemplary embodiments of the invention as relating to exemplary apparatus described herein.

(4) In another exemplary embodiment of the invention, an apparatus comprising: means for configuring a common resource space comprised of a plurality of time-frequency resources and code resources, where the common resource space is comprised of a first portion for a first type of signaling and a second portion for a second type of signaling, where the first type of signaling comprises at least one of persistent acknowledgement signaling and scheduling request signaling, where the second type of signaling comprises dynamic acknowledgement signaling; and means for allocating, based on the configured common resource space, resources of the common resource space for the at least one of persistent acknowledgement signaling and scheduling request signaling.

An apparatus as above, further comprising: means for transmitting or receiving at least one message in accordance with the allocation. An apparatus as in any above, where the means for configuring and the means for allocating comprise at least one processor and the means for transmitting or receiving comprises at least one transmitter, at least one receiver or at least one transceiver.

An apparatus as in any above, further comprising: means for receiving a first parameter indicative of a first beginning resource to use for the first type of signaling. An apparatus as in any above, where the common resource space is for a physical uplink control channel. An apparatus as in any above, where the common resource space is for at least one communication occurring within an evolved universal terrestrial radio access network. An apparatus as in any above, where the apparatus comprises a mobile station, a mobile node or a mobile phone. An apparatus as in any above, where the apparatus comprises a base station, a relay station or an evolved Node B. An apparatus as in any above, where the apparatus comprises a node within an evolved universal terrestrial radio access network.

An apparatus as in any above, further comprising one or more aspects of the exemplary embodiments of the invention as described elsewhere herein, and, in particular, one or more aspects of the exemplary embodiments of the invention as relating to exemplary apparatus described herein.

The various blocks shown in FIG. 5 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIG. 5 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIG. 5 so as to implement one or more further exemplary embodiments of the invention, such as those described in further detail herein.

That is, the non-limiting, exemplary embodiments of the invention shown in FIG. 5 may be implemented, practiced or utilized in conjunction with one or more further aspects in any combination (e.g., any combination that is practicable, suitable and/or feasible) and are not limited only to the blocks, steps, functions and/or operations illustrated in FIG. 5.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

Further, the various names used for the described parameters (e.g., $n_{PUCCH}^{(1)}$) are not intended to be limiting in any respect, as these parameters may be identified by any suitable names. Further, the formulas and expressions that use these various parameters may differ from those expressly disclosed herein. Further, the various names assigned to different channels (e.g., PUCCH) are not intended to be limiting in any respect, as these various channels may be identified by any suitable names.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving, from a base station, a configuration for a resource space comprising a plurality of time-frequency resources, wherein the resource space, which is used by the base station for resource allocation, comprises a first portion for a first type of signaling and a second portion for a second type of signaling, wherein the first type of signaling comprises persistent acknowledgement signaling and scheduling request signaling, and the second type of signaling comprises dynamic acknowledgement signaling, the first portion allowing two resources for the persistent acknowledgement signaling and the scheduling request signaling to be partially overlapping;
receiving, from the base station, an allocation of resources of the first portion for the persistent acknowledgment signaling, wherein the allocation of resources of the first portion is based on the configuration of the resource space; and
determining, in a user equipment, an allocation of resources of the second portion based on the received allocation of resources of the first portion.

2. The method as claimed in claim 1, wherein the time-frequency resources are characterized by a zero autocorrelation sequence having a length of twelve symbols, a duration of one sub-frame and/or slot-based frequency hopping that is symmetric over a center frequency.

3. The method as claimed in claim 1, wherein the time-frequency resources are characterized by a dedicated cyclic shift and/or a dedicated orthogonal cover code.

4. The method as claimed in claim 1, wherein a size for the first portion is signaled explicitly.

5. The method as claimed in claim 1, further comprising:
receiving a first parameter indicative of a number of resources used for channel quality indicator signaling.

6. The method as claimed in claim 1, wherein the resource space is for a portion of a physical uplink control channel.

7. The method as claimed in claim 1, wherein a signaling space for persistent acknowledgement and scheduling request is defined in such a manner allowing two resources for persistent acknowledgement signaling and scheduling request signaling to partially overlap.

8. A non-transitory computer-readable medium storing a program instructions executable by an apparatus for performing operations, said operations comprising:
receiving, from a base station, a configuration for a resource space comprising a plurality of time-frequency resources, wherein the resource space, which is used by the base station for resource allocation, comprises a first portion for a first type of signaling and a second portion for a second type of signaling, wherein the first type of signaling comprises persistent acknowledgement signaling and scheduling request signaling, and the second type of signaling comprises dynamic acknowledgement signaling, the first portion allowing two resources for the persistent acknowledgement signaling and the scheduling request signaling to be partially overlapping;
receiving, from the base station, an allocation of resources of the first portion for the persistent acknowledgment signaling, wherein the allocation of resources of the first portion is based on the configuration of the resource space; and
determining, in a user equipment, an allocation of resources of the second portion based on the received allocation of resources of the first portion.

9. The non-transitory computer-readable medium as claimed in claim 8, wherein a size for the first portion is signaled explicitly.

10. An apparatus comprising:
at least one processor; and
at least one memory including computer program instructions, the at least one memory and the computer program instructions being configured, with the at least one processor, to cause the apparatus at least to perform:
receiving, from a base station, a configuration for a resource space comprising a plurality of time-frequency resources, wherein the resource space, which is used by the base station for resource allocation, comprises a first portion for a first type of signaling and a second portion for a second type of signaling, wherein the first type of signaling comprises persistent acknowledgement signaling and scheduling request signaling, and the second type of signaling comprises dynamic acknowledgement signaling, the first portion allowing two resources for the persistent acknowledgement signaling and the scheduling request signaling to be partially overlapping;
receiving, from the base station, an allocation of resources of the first portion for the persistent acknowledgment signaling, wherein the allocation of resources of the first portion is based on the configuration of the resource space; and
determining, in the apparatus, an allocation of resources of the second portion based on the received allocation of resources of the first portion.

11. The apparatus as claimed in claim 10, wherein a size for the first portion is signaled explicitly.

12. A method comprising:
configuring, in a base station, a resource space comprising a plurality of time-frequency resources, wherein the resource space, which is used by the base station for resource allocation, comprises a first portion for a first type of signaling and a second portion for a second type of signaling, wherein the first type of signaling comprises persistent acknowledgement signaling and scheduling request signaling, and the second type of signaling comprises dynamic acknowledgement signaling, the first portion allowing two resources for the persistent acknowledgement signaling and the scheduling request signaling to be partially overlapping;
allocating, in the base station, based on the configuration of the resource space, resources of the first portion for the persistent acknowledgment signaling;
sending, to a user equipment, a signal indicative of the first portion whereby an allocation of resources of the beginning of the second portion is determined based on the allocated resources of the first portion.

13. A non-transitory computer-readable medium storing a program instructions executable by an apparatus for performing operations, said operations comprising:
configuring, in a base station, a resource space comprising a plurality of time-frequency resources, wherein the resource space, which is used by the base station for resource allocation, comprises a first portion for a first type of signaling and a second portion for a second type of signaling, wherein the first type of signaling comprises persistent acknowledgement signaling and scheduling request signaling, and the second type of signaling comprises dynamic acknowledgement signaling, the first portion allowing two resources for the persistent acknowledgement signaling and the scheduling request signaling to be partially overlapping;

allocating, in the base station, based on the configuration of the resource space, resources of the first portion for the persistent acknowledgment signaling;

sending, to a user equipment, a signal indicative of the first portion whereby an allocation of resources of the second portion is determined based on the allocated resources of the first portion.

14. An apparatus comprising:

at least one processor; and at least one memory including computer program instructions, the at least one memory and the computer program instructions being configured, with the at least one processor, to cause the apparatus at least to perform:

configuring, in the apparatus, a resource space comprising a plurality of time-frequency resources, wherein the resource space, which is used by the apparatus for resource allocation, comprises a first portion for a first type of signaling and a second portion for a second type of signaling, wherein the first type of signaling comprises persistent acknowledgement signaling and scheduling request signaling, and the second type of signaling comprises dynamic acknowledgement signaling, the first portion allowing two resources for the persistent acknowledgement signaling and the scheduling request signaling to be partially overlapping;

allocating, in the apparatus, based on the configuration of the resource space, resources of the first portion for the persistent acknowledgment signaling;

sending, to a user equipment, a signal indicative of the first portion whereby an allocation of resources of the second portion is determined based on the allocated resources of the first portion.

15. The apparatus as claimed in claim 14, wherein the plurality of time-frequency resources are characterized by a zero autocorrelation sequence having a length of twelve symbols, a duration of one sub-frame and/or slot-based frequency hopping that is symmetric over a center frequency, and/or by a dedicated cyclic shift and/or a dedicated orthogonal cover code.

16. The apparatus as claimed in claim 14, where the memory and the computer program code are further configured, with the at least one processor, to cause the apparatus to perform signaling a size for the first portion explicitly, and/or signaling a number of resources used for channel quality indicator signaling.

* * * * *